(12) United States Patent
Chen

(10) Patent No.: US 8,464,608 B2
(45) Date of Patent: Jun. 18, 2013

(54) BICYCLE CLIPLESS PEDAL

(75) Inventor: Chung-I Chen, Taichung (TW)

(73) Assignee: Wellgo Pedal's Corp., Taichung (TW)

( * ) Notice: Subject to any disclaimer, the term of this patent is extended or adjusted under 35 U.S.C. 154(b) by 332 days.

(21) Appl. No.: 13/014,719

(22) Filed: Jan. 27, 2011

(65) Prior Publication Data

US 2012/0192674 A1 Aug. 2, 2012

(51) Int. Cl.
*B62M 3/00* (2006.01)
*F16F 3/02* (2006.01)

(52) U.S. Cl.
USPC .................... 74/594.6; 74/594.7; 267/151

(58) Field of Classification Search
USPC .. 74/560, 594.1, 594.2, 594.6, 594.7; 36/131; 267/151, 152, 153, 201, 257, 259; 280/294
IPC ....................................................... B62M 3/00
See application file for complete search history.

(56) References Cited

U.S. PATENT DOCUMENTS

| | | | | |
|---|---|---|---|---|
| 4,130,027 A * | 12/1978 | Leighton | .......................... | 74/512 |
| 5,787,764 A * | 8/1998 | Peyre | ............................ | 74/594.6 |
| 6,425,304 B1 * | 7/2002 | Bryne | .......................... | 74/594.6 |
| 7,021,175 B1 * | 4/2006 | Xie | ............................... | 74/594.6 |
| 7,430,941 B2 * | 10/2008 | Muraoka et al. | ............. | 74/594.6 |
| 2008/0289445 A1 * | 11/2008 | Hsieh | .............................. | 74/560 |

* cited by examiner

*Primary Examiner* — Thomas R Hannon
*Assistant Examiner* — Adam D Rogers

(57) ABSTRACT

A bicycle clipless pedal includes a pedal, a locking sheet pivotally mounted on the pedal, and a plastic elastomer located between the pedal and the locking sheet. The pedal has a first clipless end extending therefrom. The locking sheet has a second first clipless end extending therefrom opposite to the first clipless end. A clipping space is defined between the first clipless end and the second clipless end. The elastomer has one end abutting against the pedal and the other end abutting against the locking sheet.

3 Claims, 5 Drawing Sheets

BICYCLE CLIPLESS PEDAL

BACKGROUND OF THE INVENTION

1. Field of the Invention

The present invention relates to a pedal, and more particularly to a bicycle clipless pedal provides a plastic elastomer for elastically pressing a locking sheet relative to the pedal to provide a light weight and lower manufactured cost.

2. Description of Related Art

A conventional bicycle pedal includes a pedal and a locking sheet assembly pivotally mounted on the pedal. The locking sheet assembly has a metallic spring mounted thereon for providing an elastic pressing force relative to the locking sheet assembly. The pedal has an axle hole defined therein. A bearing set and a spindle are received in the axle hole. The spindle is provided for mounting on the bicycle. The pedal has a controller rotatably mounted thereon adjacent to the locking sheet assembly. The controller has a shape having various diameters for corresponding to the locking sheet assembly. When the controller is rotated to change the diameter of the controller, a movement of the locking sheet assembly is restricted for adjusting a clipping force.

However, a weight of the metallic spring of the conventional bicycle pedal has a heavy and the cost of the metallic spring is also expensive. In the modern market requirement, a light weight bicycle is necessary. Especially, the clipless pedals are usually utilized on the racing bike, the light-weight requirement is more important than other bikes.

The present invention has arisen to mitigate and/or obviate the disadvantages of the conventional bicycle pedal.

SUMMARY OF THE INVENTION

The main objective of the present invention is to provide an improved pedal, and more particular to a bicycle clipless pedal having a light weight and lower cost.

To achieve the objective, the bicycle clipless pedal in accordance with the present invention includes a pedal, a locking sheet pivotally mounted on the pedal, and a plastic elastomer located between the pedal and the locking sheet. The pedal is pivotable relative to the locking sheet. The pedal has a first clipless end extending therefrom. The locking sheet has a second first clipless end extending therefrom opposite to the first clipless end. A clipping space is defined between the first clipless end and the second clipless end for adapting to receive a cleat of a cycling shoe. The elastomer is a part of a pivot between the pedal and the locking sheet. The elastomer has one end abutting against the pedal and the other end abutting against the locking sheet for proving a resilience force to elastically press the locking sheet toward to the pedal, such that the locking sheet is elastically pivoted relative to the pedal for adapting to clip the cleat of the cycling shoe. The locking sheet has two ear rings extending therefrom and facing to each other. The pedal has a tenon ring extending therefrom for positioning between the two ear rings of the locking sheet. The elastomer has a through hole laterally defined therein and passing therethrough. A pivot rod passes through the two ear rings of the locking sheet, the tenon ring of the pedal, and the through hole in the elastomer to form the pivot between the pedal and the locking sheet. The tenon ring has a groove defined therein for partially receiving the elastomer. The locking sheet has an abutting blocker extending therefrom and located between the two ear rings for abutting against the elastomer. The pedal has a restricting rib extending therefrom and located in the clipping space for abutting against the locking sheet to prevent the locking sheet folding over the pedal. The pedal has a spindle pivotally passing therethrough for adapting to connect with a bicycle crank. The elastomer substantially has a trapezoid shape to form a narrow end and a broad end opposite to the narrow end. The through hole is located in the narrow end of the elastomer.

Comparing the conventional bicycle pedal, the elastomer of the present invention is provided for elastically pivoting the locking sheet relative to the pedal. The elastomer of the present invention is made of elastic material such that the elastomer of the present invention is lighter than the spring of the conventional bicycle pedal. The manufactured cost of elastomer of the present invention is also lower than the spring of the conventional bicycle pedal.

Further benefits and advantages of the present invention will become apparent after a careful reading of the detailed description with appropriate reference to the accompanying drawings.

DETAILED DESCRIPTION OF THE INVENTION

Figure 1:
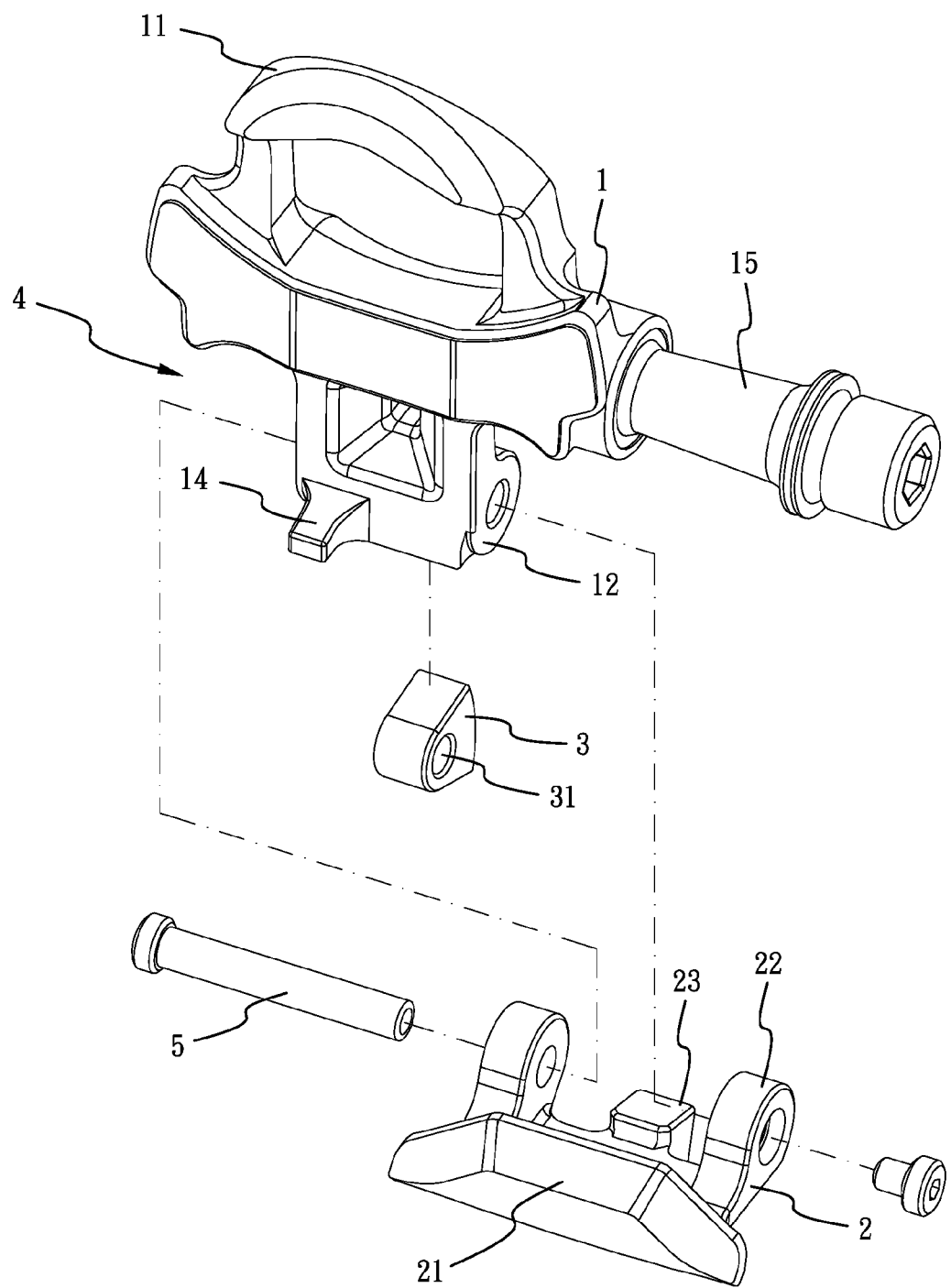
FIG. 1 is an exploded perspective view of a bicycle clipless pedal in accordance with the present invention.
Figure 2:
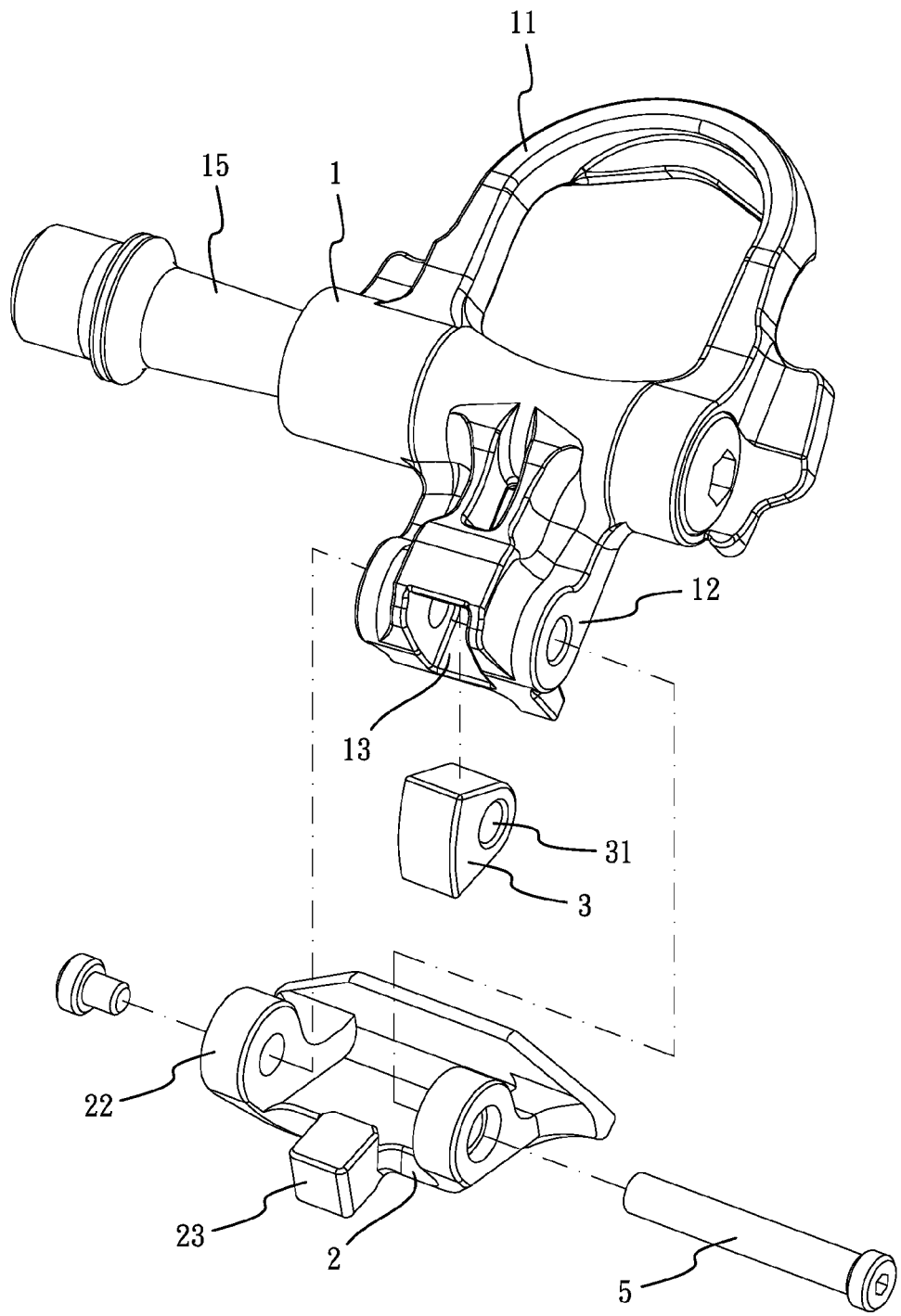
FIG. 2 is an exploded perspective view of the bicycle clipless pedal in accordance with the present invention in another direction.
Figure 3:
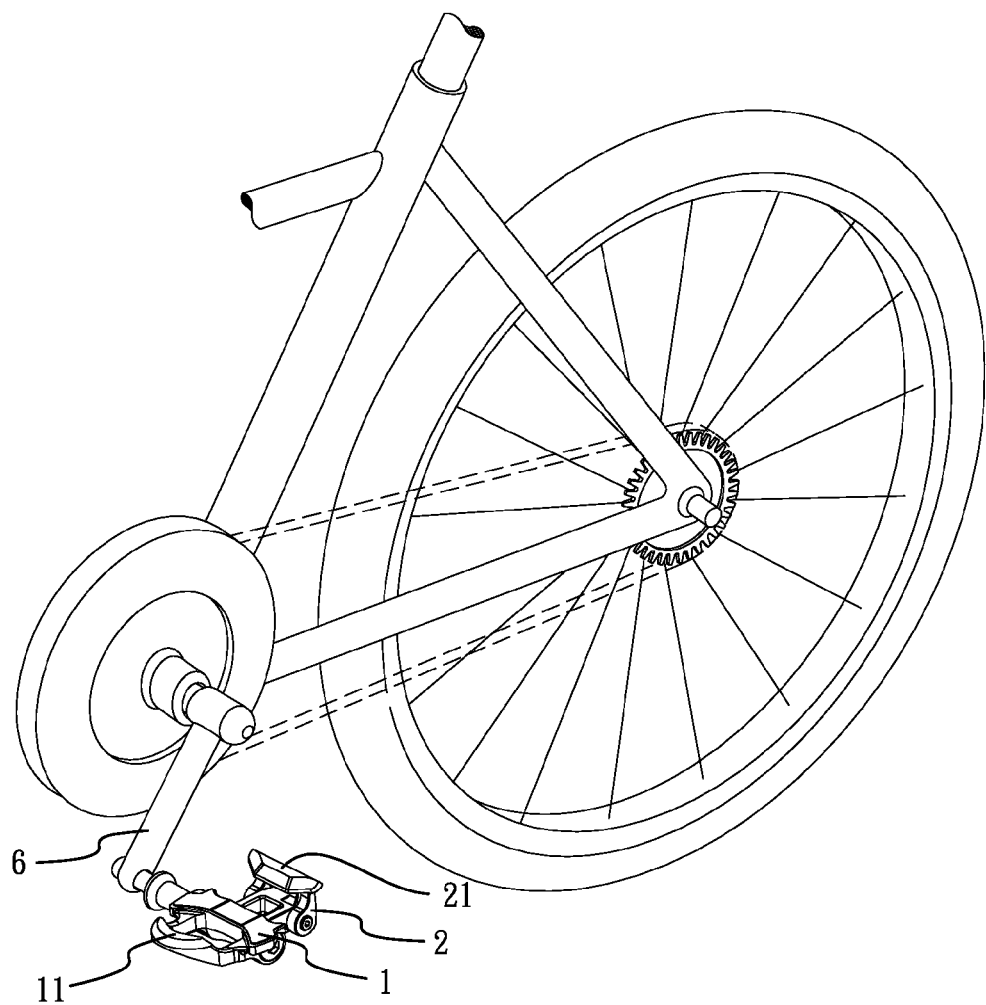
FIG. 3 is an assembled perspective view of the bicycle clipless pedal in accordance with the present invention which is assembled with a bicycle crank.

Referring to the drawings and initially to FIGS. 1-3, a bicycle clipless pedal in accordance with the present invention comprises a pedal 1, a locking sheet 2 pivotally mounted on the pedal 1, and a plastic elastomer 3 located between the pedal 1 and the locking sheet 2. The elastomer 3 has an elasticity coefficient dependent on the plastic material.

The pedal 1 is pivotable relative to the locking sheet 2. The pedal 1 has a first clipless end 11 extending therefrom.

The locking sheet 2 has a second clipless end 21 extending therefrom opposite to the first clipless end 11. A clipping space 4 is defined between the first clipless end 11 and the second clipless end 21 for adapting to receive a cleat (not shown) of a cycling shoe (the cleat is a conventional structure and is not further described the detail in the following).

The elastomer 3 is a part of a pivot between the pedal 1 and the locking sheet 2. The elastomer 3 has one end abutting against the pedal 1 and the other end abutting against the locking sheet 2 for proving a resilience force to elastically press the locking sheet 2 toward to the pedal 1, such that the locking sheet 2 is elastically pivoted relative to the pedal 1 for adapting to clip the cleat of the cycling shoe.

The locking sheet 2 has two ring portions 22 extending therefrom and facing to each other. The pedal 1 has a tenon ring 12 extending therefrom for positioning between the two ring potiond 22 of the locking sheet 2. The elastomer 3 has a through hole 31 laterally defined therein and passing therethrough. A pivot rod 5 passes through the two ring portions 22 of the locking sheet 2, the tenon ring 12 of the pedal 1, and the through hole 31 in the elastomer 3 to form the pivot between the pedal 1 and the locking sheet 2. The tenon ring 12 has a groove 13 defined therein for partially receiving the elastomer 3. The locking sheet 2 has an abutting blocker 23 extending therefrom and located between the two ring portions 22 for abutting against the elastomer 3. The pedal 1 has a restricting rib 14 extending therefrom and located in the clipping space 4 for abutting against the locking sheet 2 to prevent the locking sheet 2 folding over the pedal 1. The pedal 1 has a spindle 15 pivotally passing therethrough for adapting to connect with a bicycle crank 6. The groove 13 has an inner periphery correspondingly fitting with the elastomer 3. When the elastomer 3 is compressed and deformed, the inner periphery of the groove 13 is correspondingly abutted against the elastomer 3.

Furthermore, the elastomer 3 is trapezoid-shaped, so that the elasomer 3 has a narrow end and a broad end opposite to the narrow end. The through hole 31 is located in the narrow end of the elastomer 3. The broad end of the elastomer 3 is abutted against the abutting blocker 23 for increasing a rotating stroke of the blocking sheet 2 relative to the pedal 1.

Figure 4:
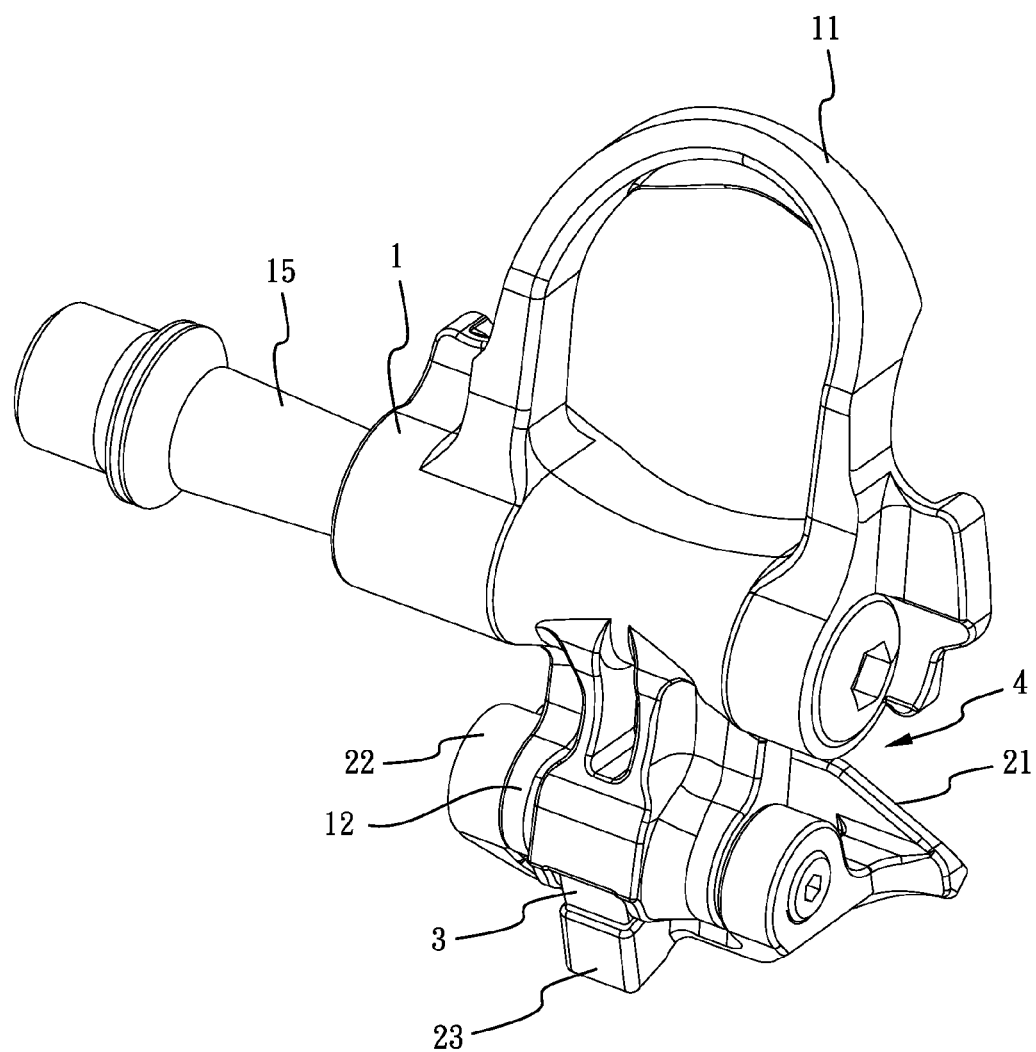
FIGS. 4-5 are operational perspective views of the bicycle clipless pedal in accordance with the present invention.
Figure 5:
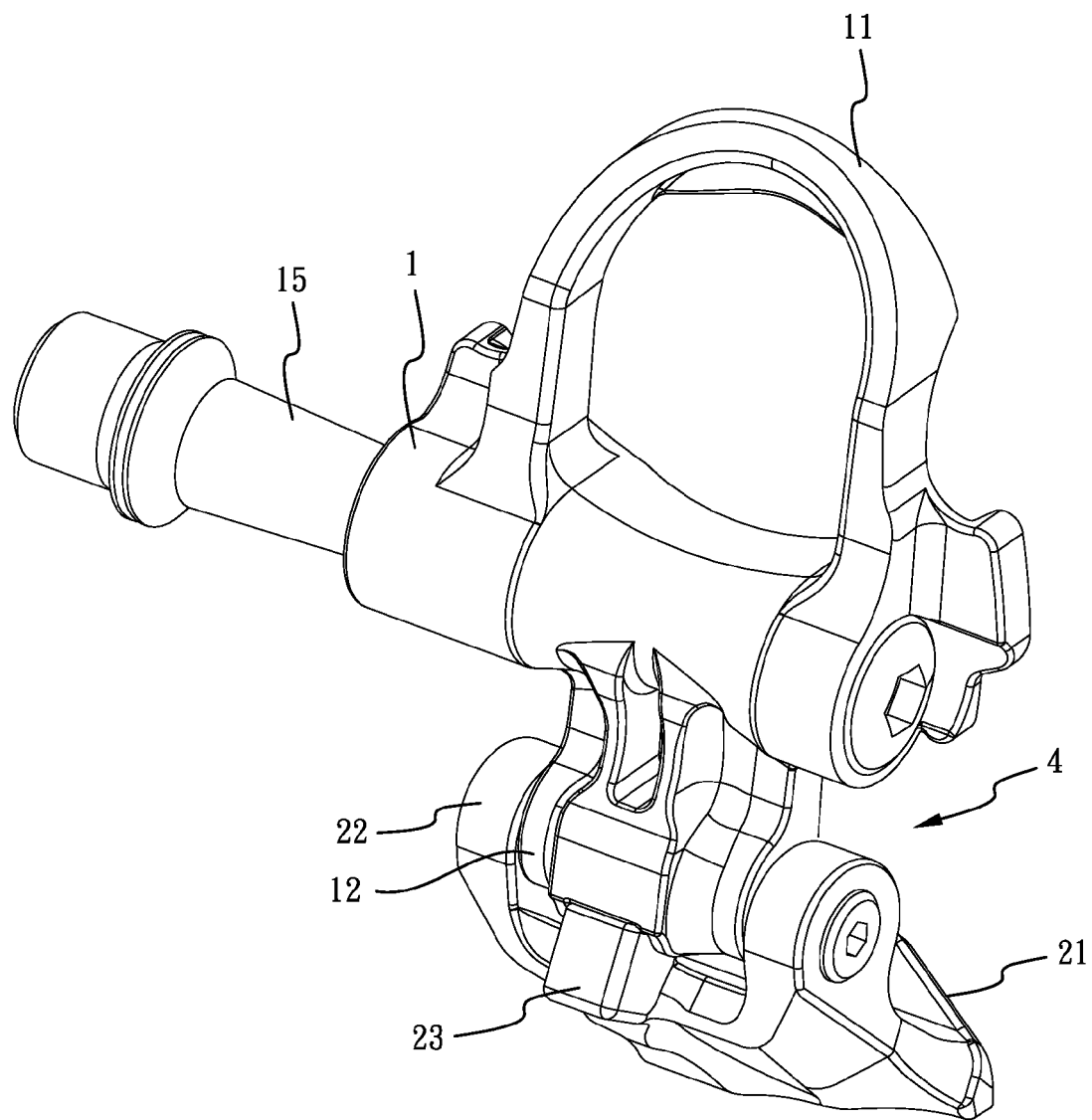

Referring to FIGS. 4-5, in the initial stage, as shown in FIG. 4, the elastomer 3 is not deformed and is abutted against the inner periphery of the groove 13 in the pedal 1 and the abutting blocker 23 of the locking sheet 2, such that the second clipless end 21 is pivotally clamped toward the first clipless end 11. When the cleat of the cycling shoe is pressed into the clipping space 4 between the first clipless end 11 and the second clipless end 21, as shown in FIG. 5, the locking sheet 2 is pivoted relative to the pedal 1 as the pivot of the pivot rod 5. The inner periphery of the groove 13 is abutted against the elastomer 3 and the elastomer 3 is deformed, such that the second clipless end 21 is pivotally moved away from the first clipless end 11 for receiving the cleat of the cycling shoe.

Although the invention has been explained in relation to its preferred embodiment, it is to be understood that many other possible modifications and variations can be made without departing from the spirit and scope of the invention as hereinafter claimed.

What is claimed is:

1. A bicycle clipless pedal, comprising:
    a pedal, the pedal having a first clipless end extending therefrom;
    a locking sheet pivotally mounted on the pedal, the locking sheet being elastically pivotable relative to the pedal, the locking sheet having a second clipless end extending therefrom opposite to the first clipless end, a clipping space defined between the first clipless end and the second clipless end for adapting to receive a cleat of a cycling shoe;
    an elastomer located between the pedal and the locking sheet, the elastomer being a part of a pivot between the pedal and the locking sheet, the elastomer having one end abutting against the pedal and the other end abutting against the locking sheet for proving a resilience force to elastically press the locking sheet toward to the pedal, such that the locking sheet is elastically pivoted relative to the pedal for adapting to clip the cleat of the cycling shoe;
    the locking sheet having two ring portions extending therefrom and facing to each other, the pedal having a tenon ring extending therefrom for positioning between the two ring portions of the locking sheet, the elastomer having a through hole laterally defined therein and passing therethrough, a pivot rod passing through the two ring portions of the locking sheet, the tenon ring of the pedal, and the through hole in the elastomer to form the pivot between the pedal and the locking sheet, the tenon ring having a groove defined therein for partially receiving the elastomer, the locking sheet having an abutting blocker extending therefrom and located between the two ring portions for abutting against the elastomer; and
    the elastomer being trapezoid-shaped, so that the elastomer has a narrow end and a broad end opposite to the narrow end, the through hole located in the narrow end of the elastomer.

2. The bicycle clipless pedal as claimed in claim 1, wherein the pedal has a restricting rib extending therefrom and located in the clipping space for abutting against the locking sheet to prevent the locking sheet folding over the pedal.

3. The bicycle clipless pedal as claimed in claim 1, wherein the pedal has a spindle pivotally passing therethrough for adapting to connect with a bicycle crank.

\* \* \* \* \*